US012767577B2

(12) United States Patent
Yousefbeiki et al.

(10) Patent No.: US 12,767,577 B2
(45) Date of Patent: Oct. 20, 2026

(54) METHOD FOR FABRICATING A TRANSPARENT OPEN CONTAINER

(71) Applicant: AGC GLASS EUROPE, Louvain-la-Neuve (BE)

(72) Inventors: Mohsen Yousefbeiki, Gosselies (BE); Rafik Addaci, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 106 days.

(21) Appl. No.: 18/857,690

(22) PCT Filed: Apr. 19, 2023

(86) PCT No.: PCT/EP2023/060189
§ 371 (c)(1),
(2) Date: Oct. 17, 2024

(87) PCT Pub. No.: WO2023/203102
PCT Pub. Date: Oct. 26, 2023

(65) Prior Publication Data

US 2025/0243103 A1 Jul. 31, 2025

(30) Foreign Application Priority Data

Apr. 21, 2022 (EP) .................................... 22169298

(51) Int. Cl.
*H01Q 1/22* (2006.01)
*B29C 65/00* (2006.01)
(Continued)

(52) U.S. Cl.
CPC .............. *C03B 23/06* (2013.01); *B29C 66/47* (2013.01); *B29C 66/742* (2013.01); *B32B 15/02* (2013.01);
(Continued)

(58) Field of Classification Search
CPC ....... C03B 23/06; B29C 66/47; B29C 66/742; B32B 15/02; B32B 17/10018;
(Continued)

(56) References Cited

U.S. PATENT DOCUMENTS

2016/0172765 A1 6/2016 Motta-Cruz et al.

FOREIGN PATENT DOCUMENTS

JP 2007-288116 A 11/2007
JP 2008-135476 A 6/2008
JP 4849776 B2 1/2012

OTHER PUBLICATIONS

International Search Report issued Jun. 15, 2023 in PCT/EP2023/060189, filed on Apr. 19, 2023, 4 pages.

*Primary Examiner* — Graham P Smith
(74) *Attorney, Agent, or Firm* — Oblon, McClelland, Maier & Neustadt, L.L.P.

(57) ABSTRACT

A method for manufacturing a transparent open container, the method including providing a continuous metallic-based sheet, having a first surface and a second surface; the continuous metallic-based sheet, having folding lines forming a central zone and at least two lateral zones. The method further including depositing on the first surface of the continuous metallic-based sheet, a transparent dielectric panel being fixed by an interlayer; forming a flat assembly, extending along a plane, P, defined by a longitudinal axis, X, and a vertical axis, Z; having a width, W, measured along the longitudinal axis, X, and a height, H, measured along the vertical axis, Z. The method still further including bending on the folding lines the flat assembly to form the open container to form a transparent open container, defined by X, Z and a Y-axis, and having a depth, D, measured along the Y-axis.

12 Claims, 8 Drawing Sheets

(51) Int. Cl.

| | |
|---|---|
| ***B32B 15/02*** | (2006.01) |
| ***B32B 17/10*** | (2006.01) |
| ***C03B 23/06*** | (2006.01) |
| ***H01Q 1/12*** | (2006.01) |
| *B29L 31/34* | (2006.01) |

(52) U.S. Cl.
CPC .... *B32B 17/10018* (2013.01); *B32B 17/1022* (2013.01); *B32B 17/10889* (2013.01); *H01Q 1/12* (2013.01); *H01Q 1/22* (2013.01); *B29L 2031/3456* (2013.01); *B32B 2305/38* (2013.01); *B32B 2457/00* (2013.01)

(58) Field of Classification Search
CPC .......... B32B 17/1022; B32B 17/10889; B32B 2305/38; B32B 2457/00; H01Q 1/12
See application file for complete search history.

METHOD FOR FABRICATING A TRANSPARENT OPEN CONTAINER

CROSS REFERENCE TO RELATED APPLICATIONS

This application is a National Stage entry under 35 U.S.C. § 371 of PCT/EP2023/060189, filed on Apr. 19, 2023, and claims priority to EP Patent Application No. 22169298.1, filed on Apr. 21, 2022, the entire contents of which are incorporated herein by reference.

TECHNICAL FIELD

The present invention relates to a method for manufacturing a transparent open container in general and, more specifically, to a method for manufacturing an enhanced performance antenna system where a transparent open container is used to reduce back radiation of the antenna system.

BACKGROUND ART

The advent of 5G with the promise of abundant and low-latency data traffic has put mobile network operators under CAPEX pressure. Higher frequency bands for 5G bring more challenges for coverage deployment, especially in dense urban areas where capacity will be needed and strict EMF limitations apply. The deployment of small cells are described as a good solution for capacity improvement which requires to install a large number of antennas in order to stably perform electromagnetic wave transmission and reception. However, many drawbacks limit the deployment of small cells. First, it is very difficult to find location for new antennas. Second, bringing fiber and electricity outdoor is costly. Finally, urbanistic regulations may limit possibilities for small cells.

Therefore, a promising method for such inevitable network densification is to install the antennas and/or the its associated electronics in buildings in front of glazing while the antenna's main beam is towards the glazing to provide coverage outside the building. This solution brings many advantages compared to other solutions, including quick and easy installation, easy access to fiber and power, and indoor electronics. Furthermore, the antenna system can be designed in such a way that it provides coverage for both indoors and outdoors. Preferably, the antenna system is a transparent antenna in order to keep the aesthetics of the building as much as possible.

On the other hand, it is also necessary to limit the radiation of such indoor-installed antennas inside the buildings in order to comply with the electromagnetic field (EMF) regulations and to protect the occupants against strong radio-frequency radiation.

When an antenna is installed in buildings in front of glazing, a part of its radiated power towards the glazing is reflected back from the interface of the air and the glazing. The amount of the reflected energy depends on the various factors like the operation frequency, the composition of the glazing and its coating system, and the polarization and the direction of the antenna's main beam.

On the other side, the antenna itself not only radiates within its main beam, but also emits an amount of energy in all directions including backwards.

According to the technique described in EP19154761.1, there is at least one metallic element placed over at least a part of the non-fixing portion of the antenna system to reduce the back reflection form the interface of the air and the glazing. However, the technique does not address the problem associated with the energy emitted due to the back radiation of the antenna itself.

The document JP4849776 describes a transparent open container with a metallic-based sheet bent to obtain a casing and the associated manufacturing method.

The document US2016172765 describes an optically transparent pant antenna assembly comprising an optically transparent antenna and a reflector optically transparent.

The document JP2007288116 describes a casing for countermeasures against EMI.

The documents JP2008135476 describes an electromagnetic-shielding goods which have the shape of a case bodily shape and the associated manufacturing method.

An object of one embodiment of the present invention is to provide an antenna system such that its back radiation has to be minimized.

Another object of one embodiment of the present invention is to provide an antenna system installed in front of a glazing such that the backward radiation due to the reflection of the radiated energy from the interface of the air and the glazing has to be minimized.

SUMMARY OF INVENTION

The present invention relates, in a first aspect, to method for manufacturing a transparent open container. This transparent open container permits to surround an antenna to reduce the radiation towards undesired directions such as backwards.

The solution as defined in the first aspect of the present invention is based on that the method comprises the following steps:

A. providing a continuous metallic-based sheet, having a first surface and a second surface; the continuous metallic-based sheet, having folding lines forming a central zone and at least two lateral zones;
B. depositing on the first surface of the continuous metallic-based sheet, a transparent dielectric panel being fixed by an interlayer; forming a flat assembly, extending along a plane, P, defined by a longitudinal axis, X, and a vertical axis, Z; having a width, W, measured along the longitudinal axis, X, and a height, H, measured along the vertical axis, Z;
D. bending on the folding lines the flat assembly to form the open container to form a folded transparent open container, defined by X, Z and a Y-axis, and having a depth, D, measured along the Y-axis.

The present invention relates, in a second aspect, to method of assembling a communication system comprising the manufacturing of a transparent open container by the method according to the first aspect of the invention, and a step G of placing an antenna system inside the transparent open container.

The present invention allows the antenna system to radiate higher effective isotropic radiated power towards the desired direction and/or to radiate lower effective isotropic radiated power towards the undesired directions while placing a transparent open container manufactured by the first aspect of the present invention.

The present invention relates, in a third aspect, to a communication system comprising a transparent open container manufactured by the first aspect of the invention and an antenna system.

Furthermore, the transparent open container manufactured by the first aspect of the invention helps to reduce the energy emitted at a determined distance from the antenna system behind a window according to the third aspect of the invention.

Therefore, the present invention solves the need to reduce health risk by reducing the electromagnetic field emission of the antenna system.

It is noted that the invention relates to all possible combinations of features recited in the claims or in the described embodiments.

The following description relates to building applications but it's understood that the invention may be applicable to others fields like automotive or transportation applications.

BRIEF DESCRIPTION OF THE DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DETAILED DESCRIPTION

Figure 1:
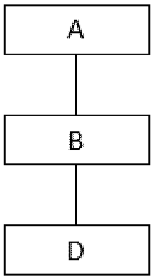
FIG. 1 is a schematic view of the method according to the first aspect of the invention.

In this document to a specific embodiment and include various changes, equivalents, and/or replacements of a corresponding embodiment. The same reference numbers are used throughout the drawings to refer to the same or like parts.

As used herein, spatial or directional terms, such as "inner", "outer", "above", "below", "top", "bottom", and the like, relate to the invention as it is shown in the drawing figures. However, it is to be understood that the invention can assume various alternative orientations and, accordingly, such terms are not to be considered as limiting. Further, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims are approximations that can vary depending upon the desired properties sought to be obtained by the present invention. In the following description, unless otherwise specified, expression "substantially" mean to within 10%, preferably to within 5%.

Moreover, all ranges disclosed herein are to be understood to be inclusive of the beginning and ending range values and to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Further, as used herein, the terms "deposited over" or "provided over" mean deposited or provided on but not necessarily in surface contact with. For example, a coating "deposited over" a substrate does not preclude the presence of one or more other coating films of the same or different composition located between the deposited coating and the substrate.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated. In this document, "configured to (or set to)" may be interchangeably used in hardware and software with, for example, "appropriate to", "having a capability to", "changed to", "made to", "capable of", or "designed to" according to a situation. In any situation, an expression "device configured to do" may mean that the device "can do" together with another device or component.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein. When it is described that a constituent element (e.g., a first constituent element) is "(functionally or communicatively) coupled to" or is "connected to" another constituent element (e.g., a second constituent element), it should be understood that the constituent element may be directly connected to the another constituent element or may be connected to the another constituent element through another constituent element (e.g., a third constituent element).

It is an object of the present invention to alleviate the above described problems and to remove the barriers to outdoor 4G and 5G network densification while having enhanced antennas installed in front of a window. Especially, the object of the first aspect of the present invention is to manufacture a transparent open container to be installed around an antenna system to reduce the back radiation.

The term "in front of" denotes that the antenna system is facing a main surface of the window.

Preferably, the antenna system, is attached directly in front of on the main surface meaning that are substantially against the main surface of the window.

According to a first aspect of the invention, the invention relates to a method for manufacturing a transparent open container 1.

In some embodiments, optical transparency and optical discretion are preferred. The latter is defined as a function of human eye acuity, which is the eye ability to distinguish objects separated from an observation distance. The term "transparent", meaning optically transparent, denotes a property illustrating the average TL (light transmission) of visible light transmitted through a material in the visible spectrum of at least 1%. Preferably, transparent relates to a TL property of at least 10%. More preferably, transparent denotes a TL of at least 50%. Ideally, transparent denotes a TL of at least 70%.

The term "open container" denotes a container having at least an opened side. The transparent open container comprises at least a back side and a lateral side.

The at least an opened side is at least the front side.

In some preferred embodiments, the transparent open container comprises at least a back side and two lateral sides.

According to the first aspect of the invention, as illustrated in FIG. 1, the method comprises a step A of providing a continuous metallic-based sheet 10, having a first surface 101 and a second surface 102; the continuous metallic-based sheet, having folding lines 11 forming a central zone 12 and at least two lateral zones 13, 14, 15, 16.

Preferably, the at least two lateral zone are opposite to each other from the central zone.

Figure 2:
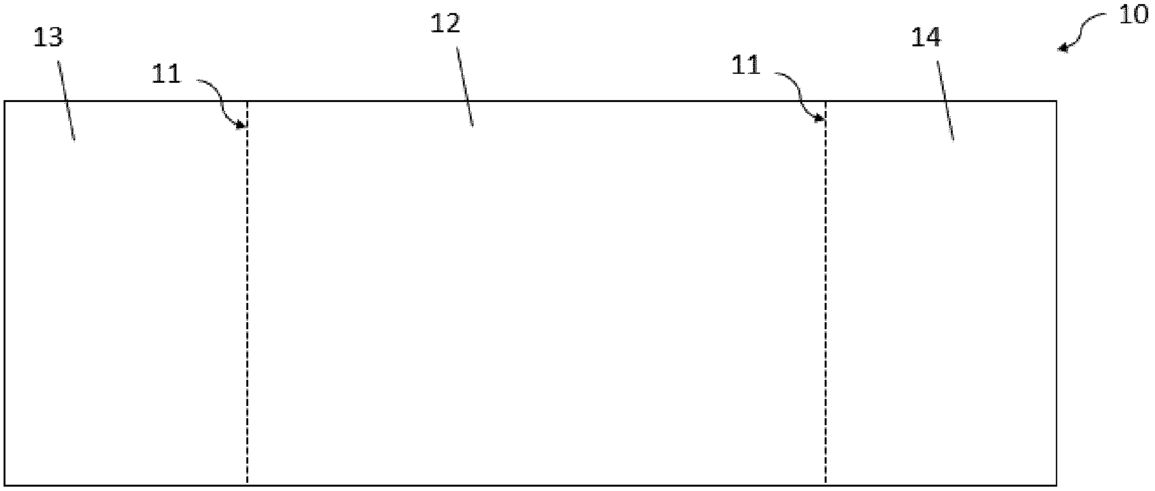
FIG. 2 is a schematic view of a transparent open container according to some embodiments of the invention.

In some embodiments, the two opposite lateral zones are along the X-axis as illustrated in FIG. 2.

In some other embodiments, two opposite lateral zones are along the Z-axis.

The term "continuous" means that the metallic-based sheet is composed of unseparated parts.

The continuous metallic-based sheet is preferably a transparent continuous metallic-based sheet.

In some embodiments, the continuous metallic-based sheet is a metallic meshed structure. The metallic meshed structure is preferably a metallic mesh in form of a grid. The grid can have any shape such as rectangular, hex, squared, circular, . . . in order to shield against EM fields at a given range of wavelengths.

The metallic meshed structure can be advantageously a transparent metallic meshed structure made of transparent semiconductor materials such as Indium Thin Oxide.

Preferably, the metallic meshed structure is not transparent.

The metallic meshed structure can be made by any known methods such as pulverisation, vacuum evaporation, laser ablation, chemical deposition (silvering, coppering, gilding, aluminiuming, tinning, nickeling . . . ), silkscreen printing, electrolytic deposit, chemical deposition in vapour phase (CVD, PECVD, OMCVD . . . ), etc.

The openings of the metallic meshed structure can be made by standard methods such as photolithography from a photomask or a mask transferred by laser writer onto a reserve and associated chemical etching, or any other known method.

A coating can be applied on top and/or bottom of the metallic meshed structure, preferably a blackened coating to protect the metallic material while reducing the diffusion.

The conductive metallic meshed structure can be obtained from a metallic foil machined in such a way it becomes optically transparent while keeping an electrical opacity. This machining is called "meshing" and is described as follows.

The metallic meshing is for example of iron, nickel, chrome, titanium, tantalum, molybdenum, tin, indium, zinc, tungsten, platinum, manganese, magnesium, lead, preferably made of silver, copper, gold or aluminum or alloy of metals selected according to conductivity electrical. It typically takes the form of a grid whereof the ratio between the dimension of the openings of the mesh and the width of the metallic tracks of the mesh defines the level of optical transparency of the sheet.

It is specified here that dimensions of the meshing is characterized by its pitch (or its periodicity), by the width and the thickness of the conductive tracks (or by the opening made in the pitch).

Preferably, the thickness and the width of the meshing is equal to or higher than three times the skin depth of the metallic material at the given range of wavelengths, preferably thickness and the width of the meshing is equal to or higher than four times the skin depth of the metallic material at the given range of wavelengths, and more preferably thickness and the width of the meshing is equal to or higher than five times the skin depth of the metallic material at the given range of wavelengths.

The optical transparency of the metallic meshed structure, TLm, is defined, in a first approximation, as the ratio of opened surfaces over total surface. The ratio can be adapted to obtain the desired optical transparency keeping an electrical opacity.

From the electrical point of view, the unit cell of the grid should much lower than the operating wavelength of an enclosed antenna system, given by the operating frequency f, in GigaHertz (GHz).

Preferably, the meshed structure is a woven metallic mesh and more preferably a fine woven metallic mesh to have this optical transparency while keeping the electrical opacity.

In some embodiments, the meshed structure is a metal, such as copper, Aluminium, silver, stainless steel. The meshed structure can be disposed on a plastic film, preferably with a thickness of 25 to 200 μm. The plastic film is preferably a polymer film and a transparent polymer film. Preferably, transparent polymer film can be polyvinyl butyral (PVB), ethylene-vinyl acetate (EVA), polymethyl methacrylate (PMMA), a polycarbonate (PC), a polystyrene (PS), a polyvinyl chloride (PVC), a polyamide (PA), a polyetherimide (PEI), a polyethylene terephthalate (PET), a polyurethane, an acrylonitrile butadiene styrene copolymer (ABS), a styrene acrylonitrile copolymer (SAN), a styrene methyl methacrylate copolymer (SMMA) and any mixtures of these, a crosslinked resin, an ionoplast, an ionomer, a cyclo-olefin polymer (COP), cyclo-Olefin copolymer (COC) or an Optical Clear Adhesive (OCA). In some other embodiments, the meshed structure is a metallized woven mesh, such as a metalized nylon fabric/mesh.

Crosslinked or cured resins are known to the skilled person and are three dimensional polymer networks obtained by the crosslinking/curing of low molecular weight species either by reaction with a curing agent also known as crosslinker or upon exposure to heat, UV radiations (UV) or electron beam (EB). Non exhaustive examples of crosslinked resins are epoxy resins, polyurethane resins, UV or EB curable resins. In the present invention, the precursors of the crosslinked resin may be transparent or not provided that the crosslinked resin is transparent.

Remark that some polymer mixtures, copolymers and some semi-crystalline polymers can be opaque and non-transparent due to a dispersed phase or due to the presence of crystallites. Hence it is possible that not all compositions of the listed polymers mentioned above are transparent. The person skilled in the art is capable to identify what composition is transparent and hence identify if a given polymer falls within the claimed transparent polymers.

The method further comprises, after the step A, a step B of depositing on the first surface 101 of the continuous metallic-based sheet, a transparent dielectric panel 20, 21, 22, 23, 24, 25, 120, 121, 122, 123, 124, 125 being fixed by an interlayer (30, 31, 32, 33, 34, 35, 130, 131, 132, 133, 134, 135); forming a flat assembly, extending along a plane, P, defined by a longitudinal axis, X, and a vertical axis, Z; having a width, W, measured along the longitudinal axis, X, and a height, H, measured along the vertical axis, Z.

The method further comprises after step B, a step D of bending on the folding lines the flat assembly to form the open container to form a folded transparent open container, defined by X, Z and a Y-axis, and having a depth, D, measured along the Y-axis.

FIGS. 2 to 12 illustrates some embodiments according to the method illustrated in FIG. 1.

FIG. 2 shows an embodiment in which the continuous metallic-based sheet of step A has two folding lines 11 forming a central zone 12 and two lateral zones 13, 14.

The term "folding line" means a virtual line on which the continuous metallic-based sheet will be bent with a defined curvature angle and radius or folded when the defined curvature radius is very small.

Folding lines are preferably straight lines to easily bend the continuous metallic-based sheet.

According to the invention, the central zone is the zone corresponding to the back side of the transparent open container once it is manufactured.

Preferably, the central zone has a shape in the X-Z plane corresponding to the shape of the antenna system to be placed inside the transparent open container.

In some preferred embodiments, the central zone has a rectangular shape in the X-Z plane to easily bend lateral zone and handle it.

According to the invention, lateral zones are zones corresponding to lateral sides of the transparent open container once it is manufactured.

Preferably, the lateral zones are opposite pair(s) with reference to the central zone.

Figure 3:
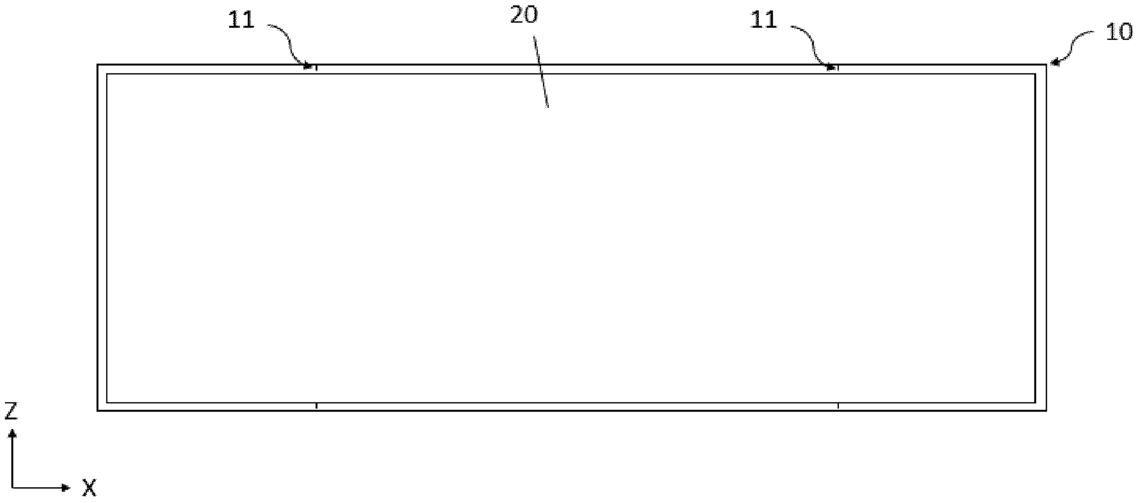
FIGS. 3 and 4 are schematic views of a flat assembly according to some embodiments of the invention.
Figure 4:
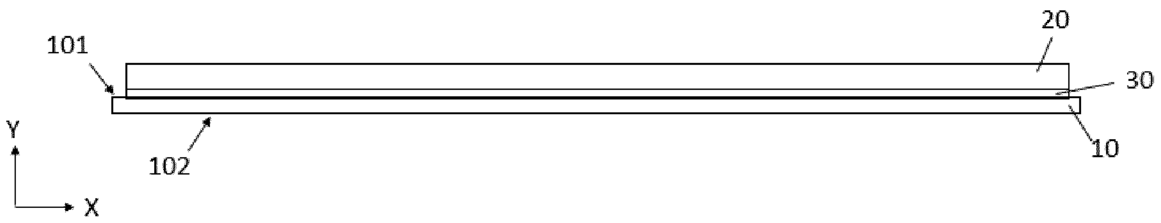

FIGS. 3 and 4 illustrates an embodiment corresponding to step B. A transparent dielectric panel 20 is deposited on the first surface of the continuous metallic-based sheet 10.

In one embodiment, the transparent dielectric panel is disposed on the majority of the first surface to cover at least 80% of surfaces of the central zone and lateral zones of the continuous metallic-based sheet, preferably at least 85% of surfaces of the central zone and lateral zones of the continuous metallic-based sheet, more preferably 90% of surfaces of the central zone and lateral zones of the continuous metallic-based sheet, more preferably 95% of surfaces of the central zone and lateral zones of the continuous metallic-based sheet and even more preferably 99% of surfaces of the central zone and lateral zones of the continuous metallic-based sheet.

According to the invention, the transparent open container comprises a dielectric panel to ensure the mechanical strength.

A dielectric panel is a panel that is not electrically conductive.

The transparent dielectric panel can have different chemical composition, such as plastic-based composition. The plastic-based composition can be PET, polycarbonate, PVC or any other transparent dielectric plastic-based that can be used as a panel.

Preferably, the transparent dielectric panel comprises a glass panel. The glass panel can comprises at least 50% in weight of SiO2 such as glass like soda lime glass, aluminosilicate glass or borosilicate glass.

In some embodiments, transparent dielectric panels has the same chemical composition to reduce the handling and the process of manufacturing.

The dielectric panels can be manufactured by a known manufacturing method such as a float method, a fusion method, a redraw method, a press molding method, or a pulling method. As a manufacturing method of the glass panel, from the viewpoint of productivity and cost, it is preferable to use the float method.

Each transparent dielectric panel can be independently processed and/or colored, . . . and/or have different thickness in order to improve the aesthetic, safety, . . . .

Each transparent dielectric panel can be processed, i.e. annealed, tempered, . . . to respect the specifications of security requirements. The transparent dielectric panel can independently be a clear or a colored transparent dielectric panel, tinted with a specific composition or by applying an additional coating or a plastic layer for example.

Preferably, borders of transparent dielectric panels are chamfered to avoid breakage, default during step D.

According to the invention, the interlayer(s) is fixing the continuous metallic-based sheet with the transparent dielectric panel(s).

As illustrated in FIG. 4, the interlayer 30 permits to fix the continuous metallic-based sheet with the transparent dielectric panel on the fixing surface of the transparent dielectric panel.

Interlayer is placed between the transparent dielectric panel and the continuous metallic-based sheet.

Preferably the interlayer is fixing the majority of the surface of the transparent dielectric panel.

In some embodiments, the interlayer can be made of a single layer of material or multiple layer of single or different materials.

In some embodiments, the interlayer can be made of single sheet of material or a plurality of sheets placed next to each other to form a single-like sheet.

In some embodiments, the interlayer is a glue.

In some other embodiments, the interlayer is a interlayer able to laminate the transparent dielectric panel with the continuous metallic-based sheet. Preferably, such interlayer can be transparent plastic interlayer. Transparent plastic interlayer can be polyvinyl butyral (PVB), ethylene-vinyl acetate (EVA), polymethyl methacrylate (PMMA), a polycarbonate (PC), a polystyrene (PS), a polyvinyl chloride (PVC), a polyamide (PA), a polyetherimide (PEI), a polyethylene terephthalate (PET), a polyurethane, an acrylonitrile butadiene styrene copolymer (ABS), a styrene acrylonitrile copolymer (SAN), a styrene methyl methacrylate copolymer (SMMA) and any mixtures of these, a crosslinked resin, an ionoplast, an ionomer, a cyclo-olefin polymer (COP), cyclo-Olefin copolymer (COC) or an Optical Clear Adhesive (OCA).

Crosslinked or cured resins are known to the skilled person and are three dimensional polymer networks obtained by the crosslinking/curing of low molecular weight species either by reaction with a curing agent also known as crosslinker or upon exposure to heat, UV radiations (UV) or electron beam (EB). Non exhaustive examples of crosslinked resins are epoxy resins, polyurethane resins, UV or EB curable resins. In the present invention, the precursors of the crosslinked resin may be transparent or not provided that the crosslinked resin is transparent.

Remark that some polymer mixtures, copolymers and some semi-crystalline polymers can be opaque and non-transparent due to a dispersed phase or due to the presence of crystallites. Hence it is possible that not all compositions of the listed polymers mentioned above are transparent. The person skilled in the art is capable to identify what composition is transparent and hence identify if a given polymer falls within the claimed transparent polymers.

The flat assembly corresponds to the stacked layers of the continuous metallic-based sheet, interlayer(s) and transparent dielectric panel(s) and the flat assembly is extending along a plane, P, defined by a longitudinal axis, X, and a vertical axis, Z; having a width, W, measured along the longitudinal axis, X, and a height, H, measured along the vertical axis, Z. Plane P is corresponding to a plane parallel to surface of the continuous metallic-based sheet.

Figure 5:
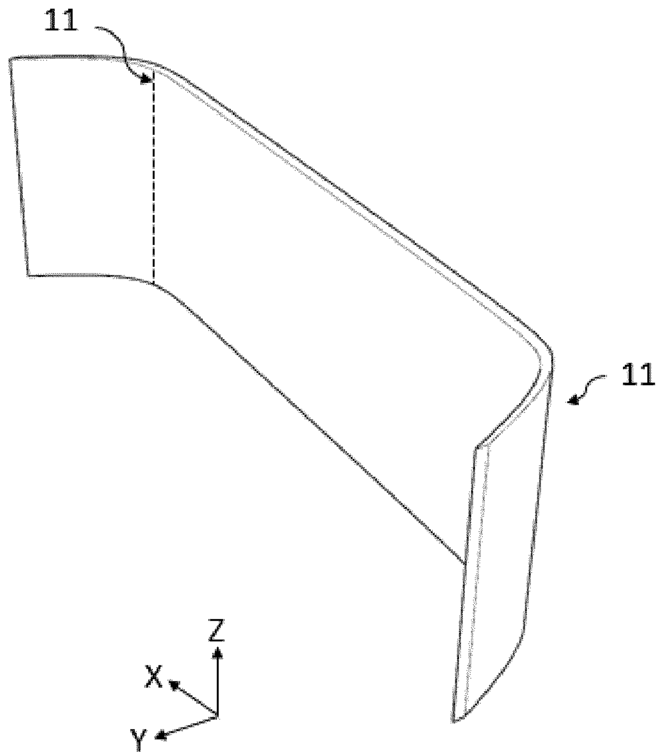
FIG. 5 is a schematic 3D view of a folded transparent open container according to some embodiments of the invention.

FIG. 5 illustrates an embodiment of a transparent open container after the bending step D. In such embodiment, the transparent dielectric panel is bent on the folding lines to form a U-shape-like transparent open container defined by X, Z and a Y-axis, and having a depth, D, measured along the Y-axis.

According to the invention, the bending angle, meaning the angle formed between the central zone and a folded lateral zone, is equal to or greater than 30°, preferably the bending angle is equal to or greater than 45°, more preferably the bending angle is equal to or greater than 60°, more preferably the bending angle is equal to or greater than 80° and even more preferably the bending angle is equal to or greater than 85°. Preferably, the bending angle, is lower than or is equal to 90°.

In a preferred embodiment, the bending angle is substantially equal to 90°.

The bending angle is measure in the X-Y plane or the Y-Z plane depending on the bent lateral zone.

In such embodiment, interlayer and transparent dielectric panel are thin and flexible enough to be bend with the desired curvature angle.

In some embodiments, within step B, a transparent dielectric panel is deposited on each central and lateral zones of the continuous metallic-based sheet; each panel being fixed by an interlayer; forming the flat assembly FIGS. 6, 7, 8 and 9 illustrates some other embodiments to form a U-shape-like transparent open container by the method of the first aspect of the invention.

Figure 6:
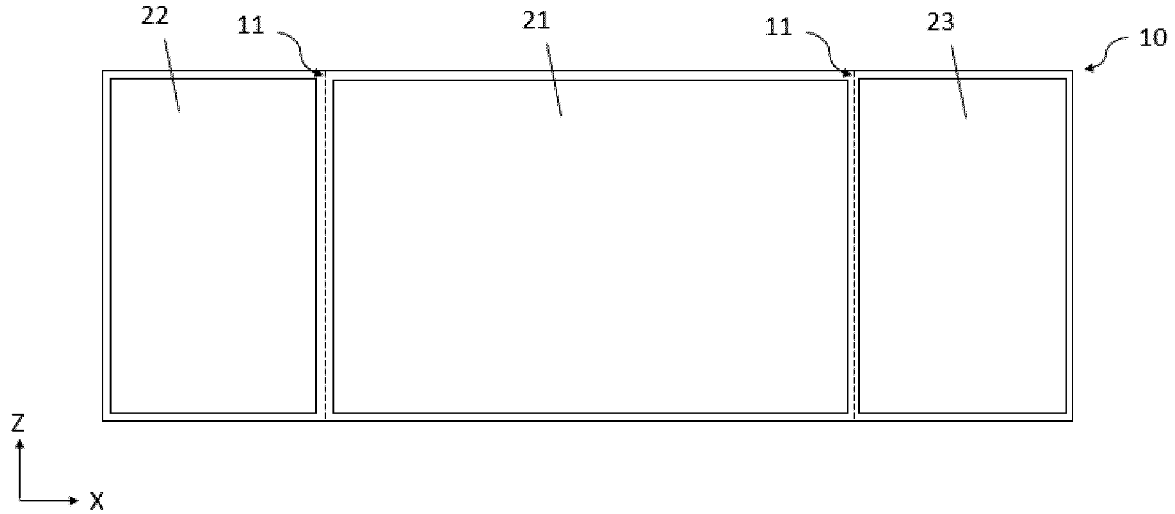
FIGS. 6, 7 and 8 are schematic views of a flat assembly according to some embodiments of the invention.

FIG. 6 illustrates an embodiment where the central zone and lateral zones of the continuous metallic-based sheet 10 are fixed to different transparent dielectric panels 21, 22, 23.

The transparent dielectric panels can have any shape corresponding to the zone on which it will be fixed. The shape of the transparent dielectric panels in a plan view is not limited to a rectangle and may be a trapezoid, a triangle, a square, a circle or the like.

Preferably, the transparent dielectric panel has substantially the same shape that the zone(s) on which is fixed.

Preferably, dimensions of adjacent transparent dielectric panels are matching, meaning that adjacent transparent dielectric panels have same width or/and same height for the parallel and adjacent side.

Preferably, surface, dimensions and shape of transparent dielectric panels are lower than or equal to the surface, dimensions and shape needed for corresponding zone(s).

The transparent dielectric panel(s) is (are) fixed by an (several) interlayer(s) forming a flat assembly.

Figure 7:
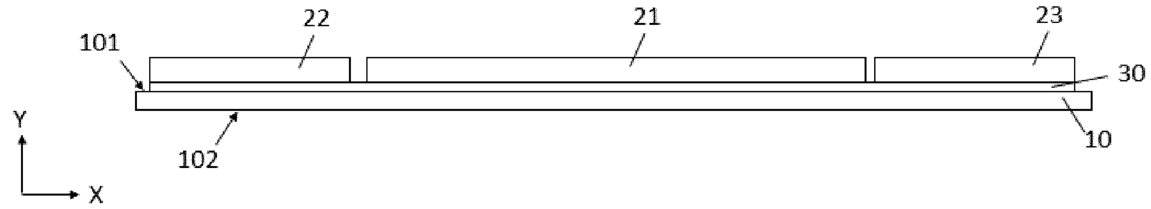

FIG. 7 shown an embodiment where transparent dielectric panels 21, 22, 23 are fixed with a interlayer 30 to minimize handling issues forming a flat assembly.

Figure 8:
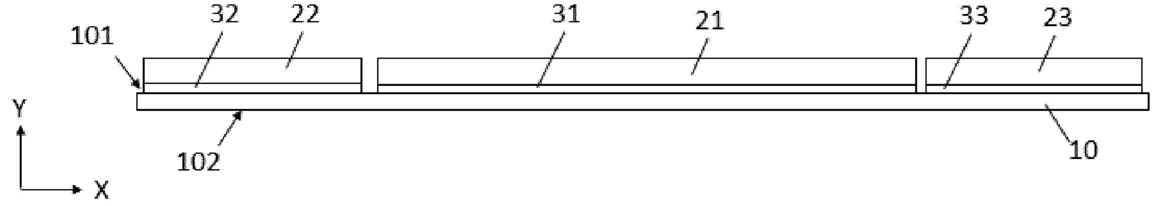

FIG. 8 illustrates another embodiment where each transparent dielectric panel 21, 22, 23 is fixed with a corresponding interlayer 31, 32, 33 to facilitate the assembling step forming a flat assembly.

In such embodiments, transparent dielectric panels can be separated from adjacent transparent dielectric panels to be bent or folded without any risk of contact between adjacent panels. This distance is equal to or greater than the maximum between the sum of thicknesses of the interlayer and corresponding transparent dielectric panel and the sum of thicknesses of adjacent interlayer and corresponding transparent dielectric panel.

Figure 9:
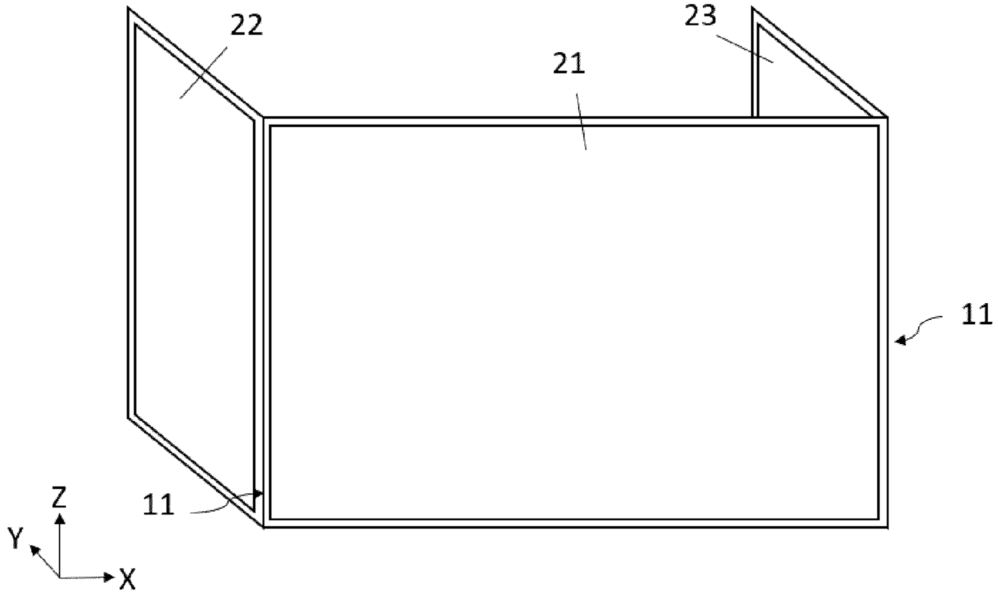
FIG. 9 is a schematic 3D view of a folded transparent open container according to some embodiments of the invention.

FIG. 9 illustrates a transparent open container obtained by folding the flat assembly on the folding lines.

According to the invention, the continuous metallic-based sheet can comprises more than two folding lines depending on the desired 3D shape.

Figure 10:
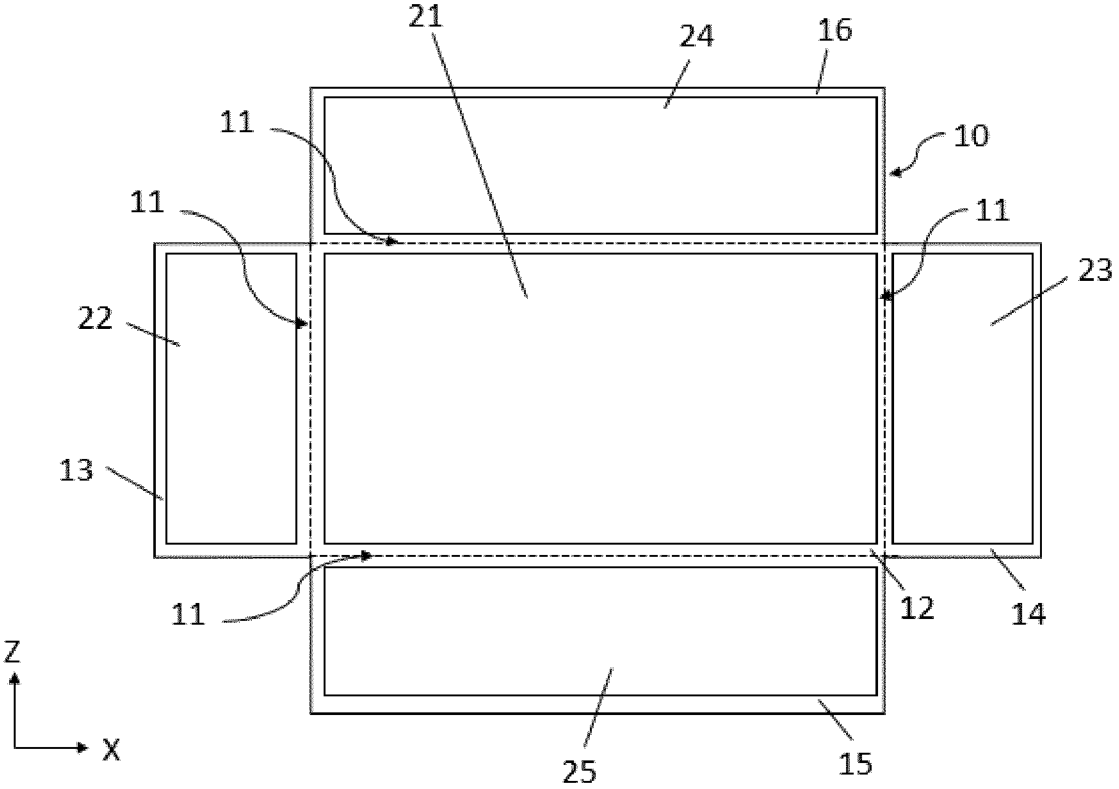
FIGS. 10 and 11 are schematic views of the method according to some embodiments of the invention.
Figure 11:
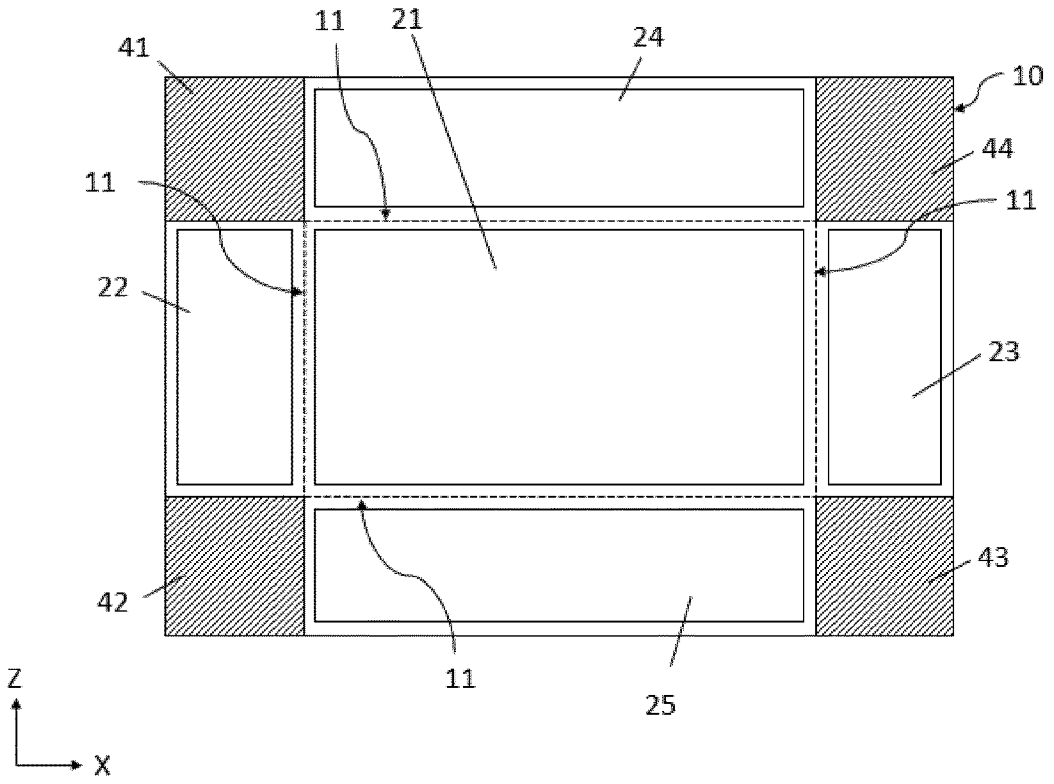
Figure 12:
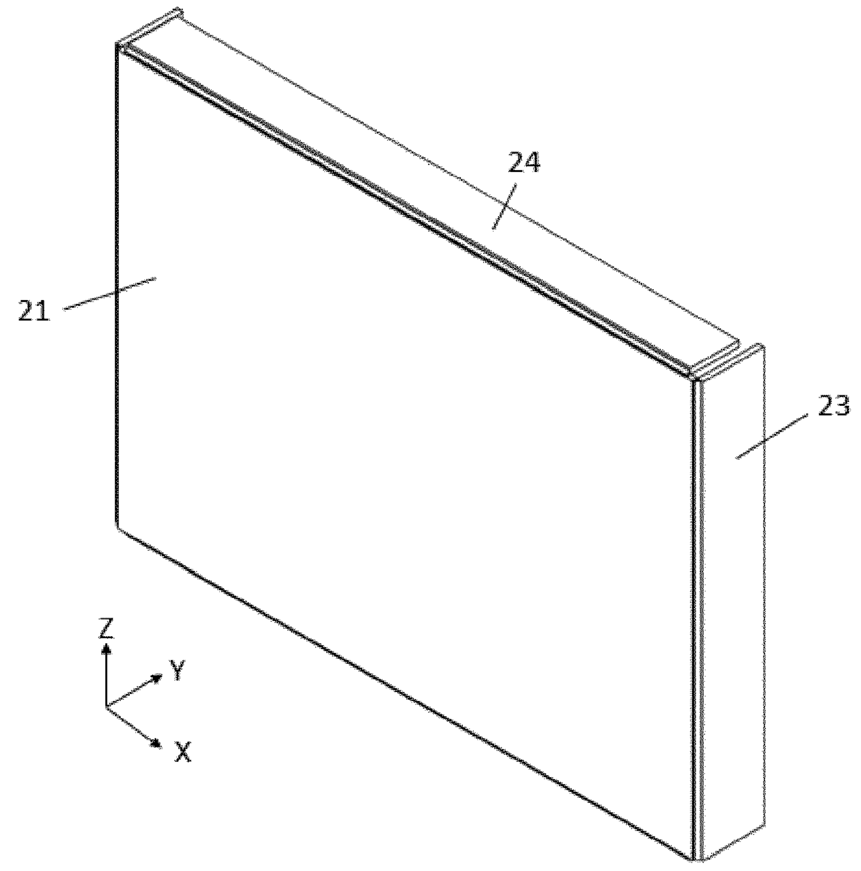
FIG. 12 is a schematic 3D view of an transparent open container according to some embodiments of the invention.
Figure 13:
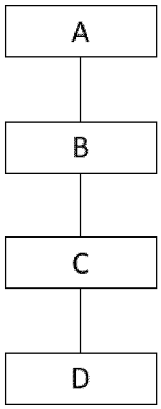
FIG. 13 is a schematic view of the method according to an embodiment of the invention.

FIGS. 10, 11, and 12 illustrate some other embodiments where the continuous metallic-based sheet comprises at least four folding lines forming a central zone and at least four lateral zones opposite two-by-two from the central zone.

In such embodiment, it is preferred to have on the first surface a transparent dielectric panel 21, 22, 23, 24, 25 per corresponding zone 12, 13, 14, 15, 16 to be fixed on the continuous metallic-based sheet 10 by a corresponding interlayer.

Figure 16:
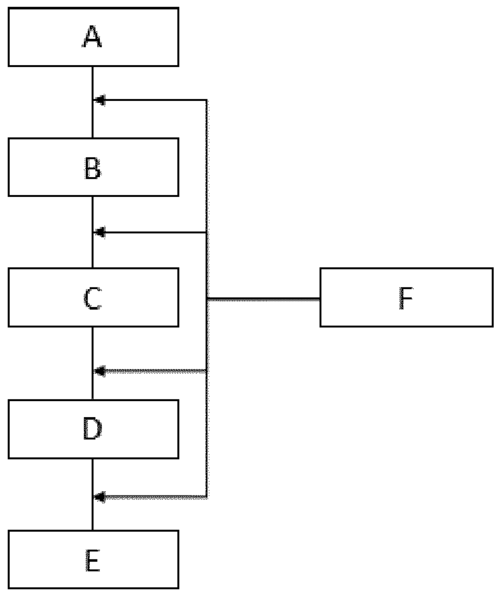
FIGS. 16, 17, 18 and 19 are schematic views of the method according to a second aspect of the invention.

FIG. 11 illustrates an embodiment where the continuous metallic-based sheet comprises oversized parts 41, 42, 43, 44. These part are preferably cut during a step F as illustrated in FIG. 16. This step F of cutting can be performed before step A, before step B, after step B. This step can also be performed after step D depending on the material of the provided continuous metallic-based sheet.

FIG. 12 illustrates a transparent open container comprising a back side corresponding to the central zone 21 and four lateral sides corresponding to the lateral zones 22, 23, 24, 25.

The transparent open container is opened on its front side opposite to the back side.

A lateral side, preferably the top side as illustrated in FIG. 12, corresponding to the lateral zone 24, can have a width measured in Y-axis different from adjacent lateral sides to let cables, fixation or other element passing out of the transparent open container.

According to the invention, the method can further comprises a step C of depositing on the second surface 102 of the continuous metallic-based sheet 10, a transparent dielectric panel being fixed by an interlayer; forming a flat assembly.

In some embodiments, the structure, meaning dimensions, number of interlayers and panels deposited during step C, can be different from the structure deposited during step B depending on specific requirements.

Figure 14:
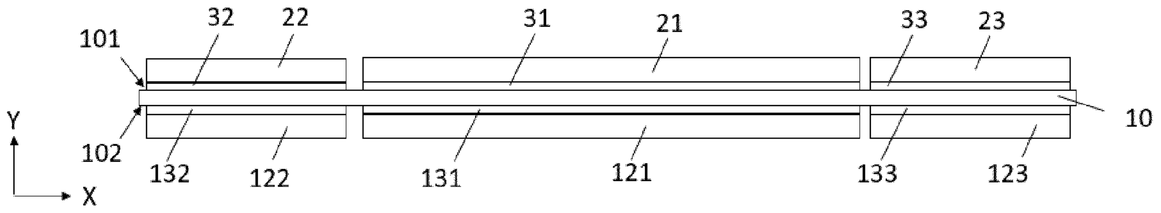
FIG. 14 is schematic views of a flat assembly according to some embodiments of the invention.

Preferably and as illustrated in FIG. 14, the same structure, meaning dimensions (perimeter, thickness, length, . . . ), number of interlayers and panels, as the one fixed in the first surface during step B, is deposited during step C. Each transparent dielectric panel deposited during step C is aligned in the Y-axis with the corresponding transparent dielectric panel deposited during step B. That means the structure deposited during step B is mirroring the structure deposited during step B. Transparent dielectric panels deposited on the second surface are aligned in all direction of the X-, Y- and Z-axis meaning that the perimeter of the panel is aligned with the corresponding panel on the first surface. That means the surface and perimeter of a transparent dielectric panel deposited during step C has substantially the same surface and perimeter than corresponding transparent dielectric panel deposited during step B.

It is preferred to sandwich the continuous metallic-based sheet with a transparent dielectric panel on the first and second surfaces via interlayers for the sake of mechanical strength.

Figure 15:
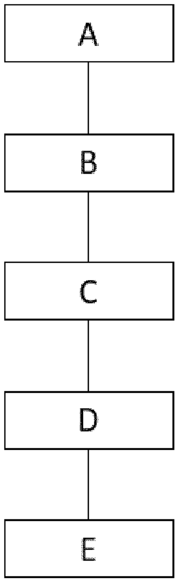
FIG. 15 is a schematic view of the method according to an embodiment of the invention.

According to the invention and as illustrated in FIG. 15, to maintain the transparent open container in a folded/bent position, the method can comprises a step E of maintaining the transparent open container in a folded position with at least fixing means.

The fixing means can be configured to attach the antenna system inside the transparent open container and configured to attach the antenna system in front of the window, meaning that the transparent open container is at least partially surrounding the antenna system. The antenna system is placed between the back side and the window at a defined distance, Daw, a strictly positive integer (Daw>0), from the window.

In some embodiments, the communication system can comprises an installation interface panel between the antenna system and the window to cancel out the impact of the window on the antenna system performance and permits to maintain the impedance response of the antenna system as well as the radiation properties of the antenna unit(s) of the antenna system within the specifications. In some embodiments, the installation interface panel can add more functionalities to the antenna system, such as the beam steering or beam shaping. The installation interface panel is placed a defined distance, Diw, a positive integer (Diw≥0), from the window.

In some embodiments, the antenna system can be in front of the exterior surface of the window to radiate through the window to the inside of the object.

In some embodiments, the antenna system can be in front of the interior surface of the window to radiate through the window to the outside of the object. The antenna system and the transparent open container are installed on the interior side of the window, meaning inside the building and the antenna radiates through the window to permit to user outside of the building to obtain an EM signal while limiting the radiation of the antenna inside of the object.

The fixing means can have several shapes depending on the specific application.

The fixing means can be a single means or a multiple means.

According to some embodiments of the invention, the fixing means can comprise a hanging means to hang the antenna system in front of the window.

The hanging means can comprise a cable, a glue, a tape or any other suitable element to hang an antenna system in front of a window.

Preferably, cables can have a diameter comprises between 0.5 and 3 mm and more preferably around 2 mm.

According to some embodiments of the invention, the fixing means can comprise a separating means to separate the antenna system at the defined distance, Daw, from the window and to separate the installation interface panel at the defined distance, Diw, from the window.

In some embodiments, the fixing means can comprises notches to place and/or displace the antenna system and the installation interface panel at the corresponding distance from the window.

Figure 17:
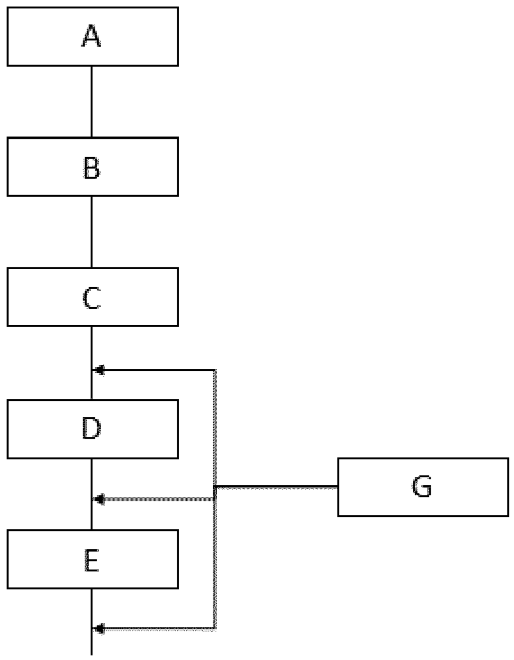

According to the second aspect of the invention, the invention relates to a method of assembling a communication system comprising the manufacturing of a transparent open container by the method according to the first aspect of the invention. This method comprises a step G of placing an antenna system inside the transparent open container. This step is performed after depositing steps (B and C) as illustrated in FIG. 17.

According to some embodiments of the invention, the fixing means can comprise an attaching means to attach the antenna system and the installation interface panel inside the transparent open container.

In some embodiments, the attaching means can comprise slots in which a portion of lateral sides are fixed and permits to maintain the transparent open container in the correct 3D shape.

In some embodiments, the separating means and the attaching means can be a single mean.

Antenna system according to the invention has typically a weight of about 1 kg to 10 kg and in some embodiments about 2 kg to 3 kg. The parallelepiped has typically a width and/or a length comprised between 20 mm to 600 mm for example a rectangular shape of 210 mm×250 mm, a rectangular shape of 150 mm×160 mm or rectangular shape of 255 mm×500 mm depending on the operating frequencies, the number of antenna arrangements, the number of elements comprised in the antenna arrangement and/or the transparency design.

The antenna system can comprises at least one antenna unit. An antenna unit works for Wi-Fi, 4G and/or 5G, meaning wavelengths with frequencies from 690 MHz to 70 GHz.

In some embodiments, the antenna system can comprises several antenna units working at the same or different range of wavelengths.

Preferably, the antenna system is a transparent antenna system. Suitable antenna systems ensuring the transparency are described in co-pending applications EP20207878.8 and EP20207890.3 which are totally incorporated by reference into the present patent application.

In some embodiments, the antenna system can comprise at least one connector protruding from the antenna system to power the antenna unit and transceive the signal. A cable is then connected to the at least one connector. The number of connectors depends of the number of antenna units and the type of antenna units used.

In such embodiments, the surface of the central zone, meaning the surface of the back side, is equal to or greater than the surface defined by the antenna system in the X_Z plane to which it is added the area defined by the height of the at least one connector to minimize back radiation of the at least one connector because the at least one connector might contribute to the radiation of the EM waves.

In some other embodiments, the cable can be directly connected to the antenna units without a connector.

According to the invention, the method of assembling can further comprise a step H of maintaining the antenna system substantially parallel to the central zone meaning the back side of the transparent open container with maintaining means.

According to the invention, the method of assembling can further comprise a step I of attaching the transparent open container with an antenna system in front of a window by the attaching means to reduce the back radiation of the antenna system.

In some embodiments, the antenna system can be already installed in front of the window, the transparent open container is therefore installed to place the antenna system inside the transparent open container over the antenna system.

Figure 18:
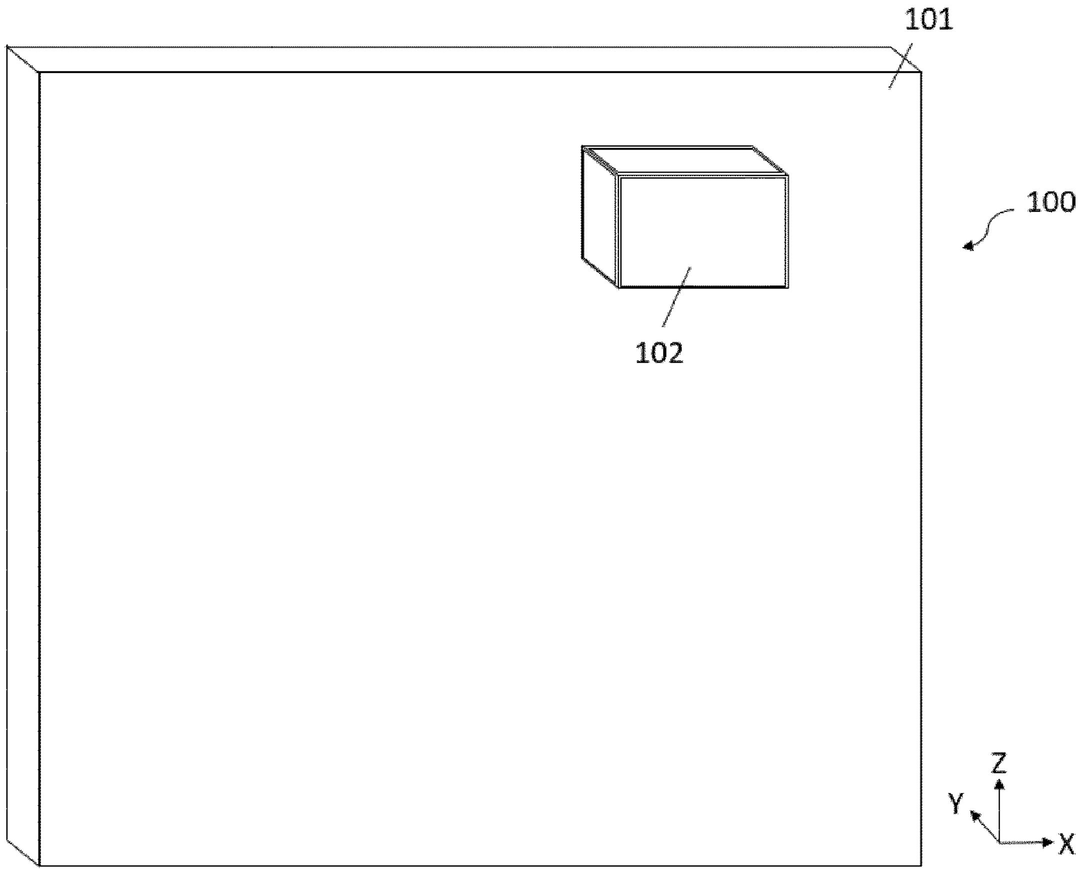
Figure 19:
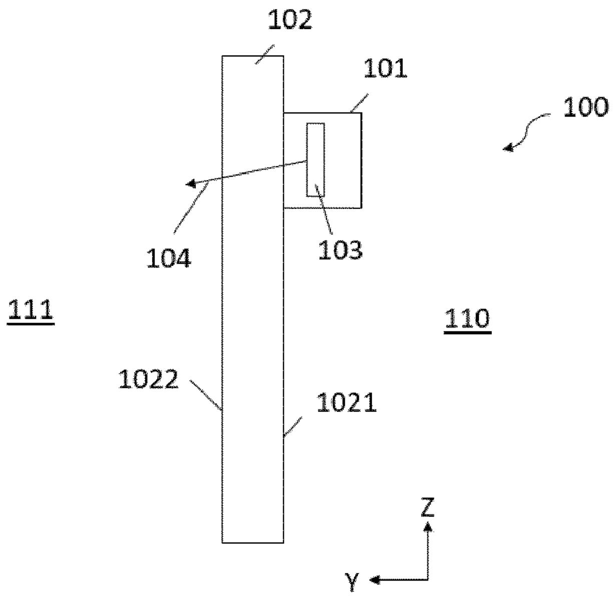

According to the third aspect of the invention and as illustrated in FIGS. 18 and 19, the invention relates to a communication system 100 comprising a window 101, a transparent open container 102 manufactured by the first aspect of the invention, an antenna system 103 radiating 104 at a defined range of wavelengths through the window; the antenna system and the transparent open container been assembled by the method according to the second aspect of the invention.

According to the invention, the antenna arrangement can be mounted on a window. The window can be a window used as a window to close an opening of the stationary object, such as a building, or to close an opening of the mobile object, such a train, a boat, . . . .

Windows are usually multi-glazed windows to increase thermal performances of the window.

The multi-glazed window can be at least partially transparent to visible waves for visibility, and natural or artificial light. The multi-glazed window is made of multiple panels separated by at least one interlayer, forming multiple interfaces. The panels therefore can be separated by a space filled with gas and/or by a polymeric interlayer.

In some embodiments, the multi-glazed window can comprise at least two glass panels separated by a spacer allowing to create a space filled by a gas like Argon to improve the thermal isolation of the multi-glazed window, assembling an insulating multi-glazed window. The invention is not limited to apparatus for use on multi-glazed window having two panels. The apparatus and method of the present invention are suitable for any multi-glazed window such as double, triple glazed windows.

In some embodiments, the glass panel can be a laminated multi-glazed window such as those to reduce the noise and/or to ensure the penetration safety. The laminated glazing comprises panels maintained by one or more interlayers positioned between glass panels. The interlayers are typically polyvinyl butyral (PVB) or ethylene-vinyl acetate (EVA) for which the stiffness can be tuned. These interlayers keep the glass panels bonded together even when broken in such a way that they prevent the glass from breaking up into large sharp pieces.

Said panels of the multi-glazed window can be made of glass, polycarbonate, PVC or any other material used for a window mounted on a stationary object or on a mobile object.

Usually, the material of the panels of multi-glazed window is, for example, soda-lime silica glass, borosilicate glass, aluminosilicate glass or other materials such as thermoplastic polymers or polycarbonates which are especially known for automotive applications. References to glass throughout this application should not be regarded as limiting.

The multi-glazed window can be manufactured by a known manufacturing method such as a float method, a fusion method, a redraw method, a press molding method, or a pulling method. As a manufacturing method of the multi-glazed window, from the viewpoint of productivity and cost, it is preferable to use the float method.

Each panel can be independently processed and/or colored, . . . and/or have different thickness in order to improve the aesthetic, thermal insulation performances, safety, . . . . The thickness of the multi-glazed window is set according to requirements of applications.

The multi-glazed window can be any known window used in situ. For example, the multi-glazed window can be processed, ie annealed, tempered, . . . to respect the specifications of security and anti-thief requirements. The window can independently be a clear glass or a colored glass, tinted with a specific composition of the glass or by applying an additional coating or a plastic layer for example. The window can have any shape to fit to the opening such as a rectangular shape, in a plan view by using a known cutting method. As a method of cutting the multi-glazed window, for example, a method in which laser light is irradiated on the surface of the multi-glazed window to cut the multi-glazed window, or a method in which a cutter wheel is mechanically cutting can be used. The multi-glazed window can have any shape in order to fit with the application, for example a windshield, a sidelite, a sunroof of an automotive, a lateral glazing of a train, a window of a building, . . . .

The shape of the multi-glazed window in a plan view is usually a rectangle. Depending of the application, the shape is not limited to a rectangle and may be a trapeze, especially for a windshield or a backlite of a vehicle, a triangle, especially for a sidelight of a vehicle, a circle or the like.

In addition, the multi-glazed window can be assembled within a frame or be mounted in a double skin façade, in a carbody or any other means able to maintain a multi-glazed window. Some plastics elements can be fixed on the multi-glazed window to ensure the tightness to gas and/or liquid, to ensure the fixation of the multi-glazed window or to add external element to the multi-glazed window. In some embodiments, a masking element, such as an enamel layer, can be added on part of the periphery of the multi-glazed window.

For thermal comfort inside the stationary object or mobile object, a coating system can be present on one interface of the multi-glazed window. This coating system generally uses a metal-based layer and infrared light is highly refracted by this type of layer. Such coating system is typically used to achieve a to a low-energy multi-glazed window.

In some embodiment, the coating system can be a heatable coating applied on the multi-glazed window to add a defrosting and/or a demisting function for example and/or to reduce the accumulation of heat in the interior of a building or vehicle or to keep the heat inside during cold periods for example. Although coating system are thin and mainly transparent to eyes.

Usually, the coating system is covering most of the surface of the interface of the multi-glazed window.

The coating system can be made of layers of different materials and at least one of these layers is electrically conductive. In some embodiments, for example in automotive windshields, the coating system can be electrically conductive over the majority of one major surface of the multi-glazed window. This can causes issues such as heated point if the portion to be decoating is not well designed.

A suitable coating system is for example, a conductive film. A suitable conductive film, is for example, a laminated film obtained by sequentially laminating a transparent dielectric, a metal film, and a transparent dielectric, ITO, fluorine-added tin oxide (FTO), or the like. A suitable metal film can be, for example, a film containing as a main component at least one selected from the group consisting of Ag, Au, Cu, and Al.

The coating system may comprise a metal based low emissive coating system. Such coating systems typically are a system of thin layers comprising one or more, for example two, three or four, functional layers based on an infrared radiation reflecting material and at least two dielectric coatings, wherein each functional layer is surrounded by dielectric coatings. The coating system of the present invention may in particular have an emissivity of at least 0.010. The functional layers are generally layers of silver with a thickness of some nanometers, mostly about 5 to 20 nm. The dielectric layers are generally transparent and made from one or more layers of metal oxides and/or nitrides. These different layers are deposited, for example, by means of vacuum deposition techniques such as magnetic field-assisted cathodic sputtering, more commonly referred to as "magnetron sputtering". In addition to the dielectric layers, each functional layer may be protected by barrier layers or improved by deposition on a wetting layer.

In some embodiments, to maximize the transmission and the reception of the antenna system in front of a window having a coating system, a decoated portion can be made in front of the antenna to alleviate attenuation due to the coating system.

In some embodiments, an installation interface panel can be placed between the antenna system and the window. The installation interface panel permits to cancels out the impact of the installation medium/media on the antenna system performance and permits to maintain the impedance response of the antenna system as well as the radiation properties of the antenna unit(s) of the antenna system within the specifications. In some embodiments, the installation interface panel can add more functionalities to the antenna system, such as the beam steering or beam shaping.

The installation interface panel can comprise at least a transparent dielectric panel such as glass and/or plastic. In some embodiments. At least a conductive pattern can be deposited on at least one of dielectric panels.

In a preferred embodiment, the antenna system 103 and the transparent open container 101 are installed on the interior side 1021 of the window 102, meaning inside the building 110 and the antenna radiates 104 through the window to permit to user outside 111 of the building to obtain an EM signal while limiting the radiation of the antenna towards undesired direction such as inside 110 the building for safety compliance and/or for network planning.

The invention claimed is:

1. A method for manufacturing a transparent open container, said method comprising:

A. providing a continuous metallic-based sheet, having a first surface and a second surface; the continuous metallic-based sheet having folding lines forming a central zone and at least two lateral zones;

B. depositing on the first surface of the continuous metallic-based sheet, a transparent dielectric panel being fixed by an interlayer; forming a flat assembly, extending along a plane, P, defined by a longitudinal axis, X, and a vertical axis, Z; having a width, W, measured along the longitudinal axis, X, and a height, H, measured along the vertical axis, Z;

D. bending on the folding lines the flat assembly to form a transparent open container, defined by X, Z and a Y-axis, and having a depth, D, measured along the Y-axis;

wherein within the depositing, a transparent dielectric panel is deposited on each of said central and lateral zones of the continuous metallic-based sheet; each panel being fixed by the interlayer;

wherein the continuous metallic-based sheet is a metallic meshed structure and wherein the metallic meshed structure is a woven metallic mesh.

2. The method according to claim 1 further comprising:

C. depositing on the second surface of the continuous metallic-based sheet, a transparent dielectric panel being fixed by an interlayer; and forming a flat assembly;

wherein each panel is aligned in the Y-axis to a corresponding panel in the first surface.

3. The method according to claim 1, wherein the continuous metallic-based sheet comprises at least four folding lines forming a central zone and at least four lateral zones opposite two-by-two.

4. The method according to claim 1, wherein the central zone has a rectangular shape.

5. The method according to claim 1, wherein the meshed structure is a metal, and wherein the meshed structure is disposed on a plastic film.

6. The method according to claim 1, wherein said transparent dielectric panel comprises a glass panel.

7. The method according to claim 1, further comprising:

E. maintaining the transparent open container in a folded position with at least fixing means.

8. A method of assembling a communication system comprising:

manufacturing of a transparent open container by the method according to claim 1, and placing an antenna system inside the transparent open container.

9. The method according to claim 8, further comprising:

H. maintaining the antenna system substantially parallel to the central zone with maintaining means.

10. The method according to claim 8, wherein the antenna system comprises at least one connector protruding from the antenna system and wherein a surface of the central zone is equal to or greater than a surface defined by the antenna system and the at least one connector.

11. The method according to claim 1, further comprising:

I. attaching the transparent open container with an antenna system in front of a window by the attaching means to reduce a back radiation of the antenna system.

12. The method according to claim 8, further comprising:

J. placing an interface layer between the antenna system and an opened side of the transparent open container to increase a radiation of the antenna through the window.

* * * * *